(12) United States Patent
Salerno (10) Patent No.: US 10,641,255 B2
(45) Date of Patent: May 5, 2020

(54) CHEMICAL CHANGEOVER SYSTEM HAVING A RESERVOIR TANK HAVING A SUBMERGED PUMP IN FLUID COMMUNICATION WITH A BLEED PATH AND A RECIRCULATION PATH TO MAINTAIN A LIQUID LEVEL IN THE RESERVOIR TANK

(71) Applicant: Sealed Air Corporation (US), Charlotte, NC (US)

(72) Inventor: Mark H. Salerno, Stratford, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 280 days.

(21) Appl. No.: 15/573,139

(22) PCT Filed: May 17, 2016

(86) PCT No.: PCT/US2016/032818
§ 371 (c)(1),
(2) Date: Nov. 10, 2017

(87) PCT Pub. No.: WO2016/191143
PCT Pub. Date: Dec. 1, 2016

(65) Prior Publication Data
US 2019/0368478 A1    Dec. 5, 2019

Related U.S. Application Data

(60) Provisional application No. 62/167,530, filed on May 28, 2015.

(51) Int. Cl.
*F04B 23/02*    (2006.01)
*B67D 7/78*    (2010.01)
(Continued)

(52) U.S. Cl.
CPC .............. *F04B 23/021* (2013.01); *B67D 7/68* (2013.01); *B67D 7/78* (2013.01); *F04F 10/00* (2013.01); *B67D 2210/00* (2013.01)

(58) Field of Classification Search
CPC .. F04D 15/0066; F04D 13/10; F04D 15/0209; F04D 13/086; F04D 27/004;
(Continued)

(56) References Cited

U.S. PATENT DOCUMENTS

| 512,220 A | 1/1894 | Roberts | |
|---|---|---|---|
| 2,217,298 A * | 10/1940 | Smith | .............................. 222/56 |

(Continued)

FOREIGN PATENT DOCUMENTS

EP    2173528 B    2/2012

OTHER PUBLICATIONS

International Search Report in PCT/US16/32818, dated Dec. 1, 2016.
(Continued)

*Primary Examiner* — Devon C Kramer
*Assistant Examiner* — Benjamin Doyle
(74) *Attorney, Agent, or Firm* — Jon M. Isaacson (57) ABSTRACT

A system for supplying a liquid. A reservoir tank has a low level and a high level of the liquid. A pump is submerged in the liquid within the reservoir tank. The pump has an inlet to receive the liquid from a source outside of the reservoir tank and an outlet to deliver the liquid to a destination outside of the reservoir tank. A bleed path places the pump outlet in fluid communication with the reservoir tank. The bleed path has a bleed valve controlling the flow of liquid through the bleed path to maintain the liquid level in the reservoir tank above the low level. A recirculation path places the pump inlet in fluid communication with the reservoir tank. The recirculation path has a recirculation
(Continued)

valve controlling the flow of liquid through the recirculation path to maintain the liquid level in the reservoir tank below the high level.

12 Claims, 11 Drawing Sheets

(51) Int. Cl.
*F04F 10/00* (2006.01)
*B67D 7/68* (2010.01)

(58) Field of Classification Search
CPC ...... F04D 13/08; F04D 15/0218; F04D 17/10; F04D 19/002; F04D 25/0686; F04D 29/104; F04D 29/108; F04D 29/32; F04D 29/426; F04D 29/4266; F04D 29/522; F04D 31/00; F04B 49/065; F04B 17/03; F04B 23/021; F04B 23/023; F04B 47/06; F04B 49/06; C02F 1/686; Y10T 137/2536; Y10T 137/7303; Y10T 137/87611; Y10T 137/87627; Y10T 137/87684; B29C 44/182; B29K 2075/00; B29K 2105/04; F04F 10/00; B67D 7/68; B67D 7/78; B67D 2210/00
USPC ....................... 417/297.5, 297–304
See application file for complete search history.

(56) References Cited

U.S. PATENT DOCUMENTS

| | | | | |
|---|---|---|---|---|
| 2,969,740 | A | * | 1/1961 | Kaatz ................. F04D 15/0218 417/18 |
| 3,401,712 | A | * | 9/1968 | White .................... C02F 1/686 137/101.27 |
| 4,616,982 | A | * | 10/1986 | Quarve ................ B05B 9/0413 417/383 |
| 4,898,327 | A | | 2/1990 | Sperry |
| 5,061,157 | A | * | 10/1991 | Arakawa ............... F04D 29/426 417/423.14 |
| 5,255,847 | A | | 10/1993 | Sperry |
| 2006/0039802 | A1 | * | 2/2006 | Gurega .............. F04D 15/0218 417/297.5 |
| 2006/0273037 | A1 | | 12/2006 | Venezia |
| 2009/0038270 | A1 | | 2/2009 | Mahon |
| 2013/0022475 | A1 | * | 1/2013 | Atchia ................. F04B 23/021 417/44.1 |
| 2015/0276130 | A1 | * | 10/2015 | Hall ......................... F17C 9/00 62/50.6 |
| 2016/0145980 | A1 | * | 5/2016 | Cunningham ........ F04D 19/002 417/423.3 |

OTHER PUBLICATIONS

Written Opinion of the International Searching Authority in PCT/US16/32818, dated Dec. 1, 2016.

* cited by examiner

CHEMICAL CHANGEOVER SYSTEM HAVING A RESERVOIR TANK HAVING A SUBMERGED PUMP IN FLUID COMMUNICATION WITH A BLEED PATH AND A RECIRCULATION PATH TO MAINTAIN A LIQUID LEVEL IN THE RESERVOIR TANK

This application claims the benefit of U.S. Provisional Application No. 62/167,530 filed May 28, 2015, which is incorporated herein in its entirety by reference.

Various embodiments of the presently disclosed subject matter relate to a system for supplying a liquid such as an isocyanate liquid from a container to an end use location.

BACKGROUND

A foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure (i.e., a polyurethane foam), which may be used to protect or cushion a packaged object.

In "foam-in-bag" packaging, a machine produces flexible containers (e.g., bags) from flexible, plastic film, and dispenses a foamable composition into the containers as they are being formed. As the composition expands into a foam within the container, the container is sealed shut and typically dropped into a carton (e.g., a box), which holds the object to be cushioned. The rising foam expands into the available space within the carton, but does so inside the container. Because the bags are formed of flexible plastic, they form individual custom foam cushions around the packaged objects. Exemplary types of such packaging apparatus are described, for example, in U.S. Pat. Nos. 4,800,708; 4,854,109; 5,027,583; 5,335,483; 5,376,219; 6,003,288; 6,472,638; 6,675,557; 7,607,911; and 8,869,859, each of which is incorporated herein in its entirety by this reference; and in U.S. Pat. App. Pub. 2007-0252297 A1, which is incorporated herein in its entirety by this reference.

In "foam-in-place" packaging, the cushioning foam is generated while an article to be protected is being packaged. For example, when polyurethane foam precursors are mixed to react and generate the polyurethane foam, by the time that the urethane foam forms and hardens (i.e., "sets") the resulting foam has expanded to fill the void spaces in the closed container and thereby cushion the object being packaged. As the composition foams to fill the remainder of the closed container, it forms a custom-shaped foam cushion surrounding the object. The object to be packaged may be covered with a polymer film or other material to protect the object from the liquid foamable composition (i.e., a mixture of the reactant precursors) that is injected or dispensed into the container onto the polymer film.

In either system, a dispenser receives, and may initiate mixing of, the foam reactant precursors from (typically) two separate supply containers (e.g., supply drums), then dispenses or injects the reactive mixture. Examples of such dispensers are described, for example, in U.S. Pat. Nos. 3,687,370; 3,945,569; 4,023,733; 4,159,079; 4,426,023; 5,186,905; 5,255,847; 5,791,522; 5,950,875; 6,811,059; 6,929,193; and 6,996,956, each of which is incorporated herein in its entirety by reference. Such systems may operate periodically or on-demand as an operator actuates the dispenser, thereby periodically activating the pumps to supply the foam precursor liquids.

Some systems for making foam-in-bag or foam-in-place polyurethane foam use a pump that is submerged within the precursor reactant liquid in the supply container. This is advantageous in that the pump located at or near the bottom of the container takes advantage of the pressure generated by the column of liquid in the container to assure sufficient suction pressure head to the pump. Further, since some types of precursor reactant liquids, such as isocyanates, will react with moisture in the air to form a hard crystalline structure or residue, the submersion of the pump in the container will minimize the chance that liquid leakage from the pump will react with ambient moisture.

However, the arrangement of submerging the pump in the supply container may necessitate a difficult and perhaps messy changeover process to withdraw the pump from an empty supply container and install it in a full supply container.

SUMMARY

In an embodiment, a system for supplying a liquid includes a reservoir tank, a pump, a bleed path, and a recirculation path. The reservoir tank has an operating range of liquid level between a low level and a high level of the liquid. The pump is positioned to be submerged in the liquid within the reservoir tank beneath the low level. The pump has an inlet to receive the liquid from a source outside of the reservoir tank and an outlet to deliver the liquid to a destination outside of the reservoir tank. The bleed path places the pump outlet in fluid communication with the reservoir tank. The bleed path has a bleed valve controlling the flow of liquid through the bleed path to maintain the liquid level in the reservoir tank above the low level. The recirculation path places the pump inlet in fluid communication with the reservoir tank. The recirculation path has a recirculation valve controlling the flow of liquid through the recirculation path to maintain the liquid level in the reservoir tank below the high level.

In another embodiment, an assembly is described for accessing liquid from a supply container having a container opening. The assembly includes a siphon tube, a coupling, and a drip cup. The siphon tube has an inlet end and an opposing outlet end. The coupling is adapted to removably engage the container opening to define a container side of the coupling facing the interior of the container as the coupling is engaged with the container opening. The coupling defines a port for slidably receiving the siphon tube through the port. The drip cup is attached to the container side of the coupling. The drip cup defines an interior and a hole generally concentric with the port of the coupling. The assembly is adjustable between: (i) an extended position in which the siphon tube extends through the port of the coupling and through the hole of the drip cup to place the outlet end of the siphon tube proximate the coupling and (ii) a withdrawn position in which the inlet end of the siphon tube is proximate the coupling and is within the interior of the drip cup.

Embodiments of the disclosed subject matter provide a pump that is external to the supply container of the liquid, yet is still submerged within the liquid. The operator does not have to lift the pump out of an empty container during changeover to a full container. Further, embodiments of the drip cup help to reduce the effect of drips from the siphon tube that may be withdrawn from the container.

These and other objects, advantages, and features of the presently disclosed subject matter will be more readily understood and appreciated by reference to the detailed description and the drawings.

Various aspects of the subject matter disclosed herein are described with reference to the drawings. For purposes of simplicity, like numerals may be used to refer to like, similar, or corresponding elements of the various drawings. The drawings and detailed description are not intended to limit the claimed subject matter to the particular form disclosed. Rather, the intention is to cover all modifications, equivalents, and alternatives falling within the spirit and scope of the claimed subject matter.

DETAILED DESCRIPTION

Embodiments of the presently disclosed subject matter are directed to a system 10 (FIGS. 1, 7) having a reservoir tank 12, a pump 14 within the reservoir tank, a bleed path 16 connecting the pump outlet 66 with the reservoir tank 12, and a recirculation path 18 connecting the pump inlet 34 with the reservoir tank 12, as described in more detail herein.

Figure 1:
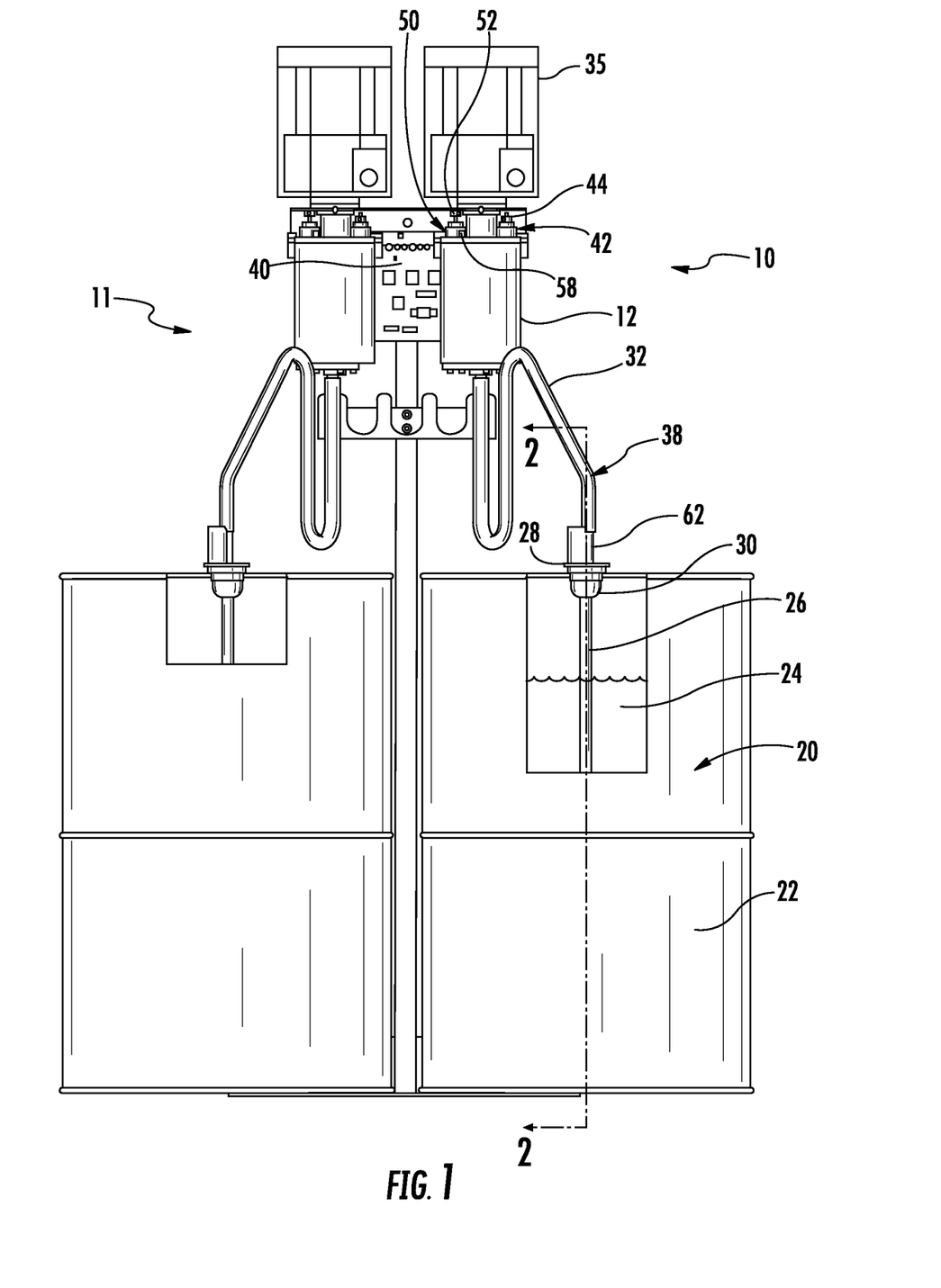
FIG. 1 is a representative elevation side view of an embodiment of the presently disclosed subject matter.

System 10 is operative to supply a liquid from a liquid source 20 to a destination outside of the reservoir tank 12, such as, for example, to a dispensing valve 100 (FIG. 14) or to the dispenser of a foam-in-bag or foam-in-place apparatus for mixing liquids to generate polyurethane foam. The destination receives the liquid 24 from the pump outlet 66. (FIG. 1, 7.) Although FIG. 1 illustrates two supply systems (i.e., system 10 and system 11), only system 10 is described in detail herein because system 11 is generally similar to system 10. Systems 10 and 11 may cooperate to provide two different liquids to the same dispenser, for example, a polyol-type of precursor reactant liquid from system 11 and a isocyanate-type of precursor reactant liquid from system 10, where these liquids may be mixed in the dispenser to provide a foamable mixture, as described in the Background section.

The liquid source 20 may include a container 22 containing liquid 24. The container 22 may have any desired capacity. The container may be one or more of any of a standardized container, bottle, or tank, such as a drum or barrel (e.g., a 55 gallon steel or plastic drum), an intermediate bulk container or IBC (e.g., a 275 gallon tote), and a 15-gallon cube; or a non-standard or customized container, bottle, or tank.

Figure 7:
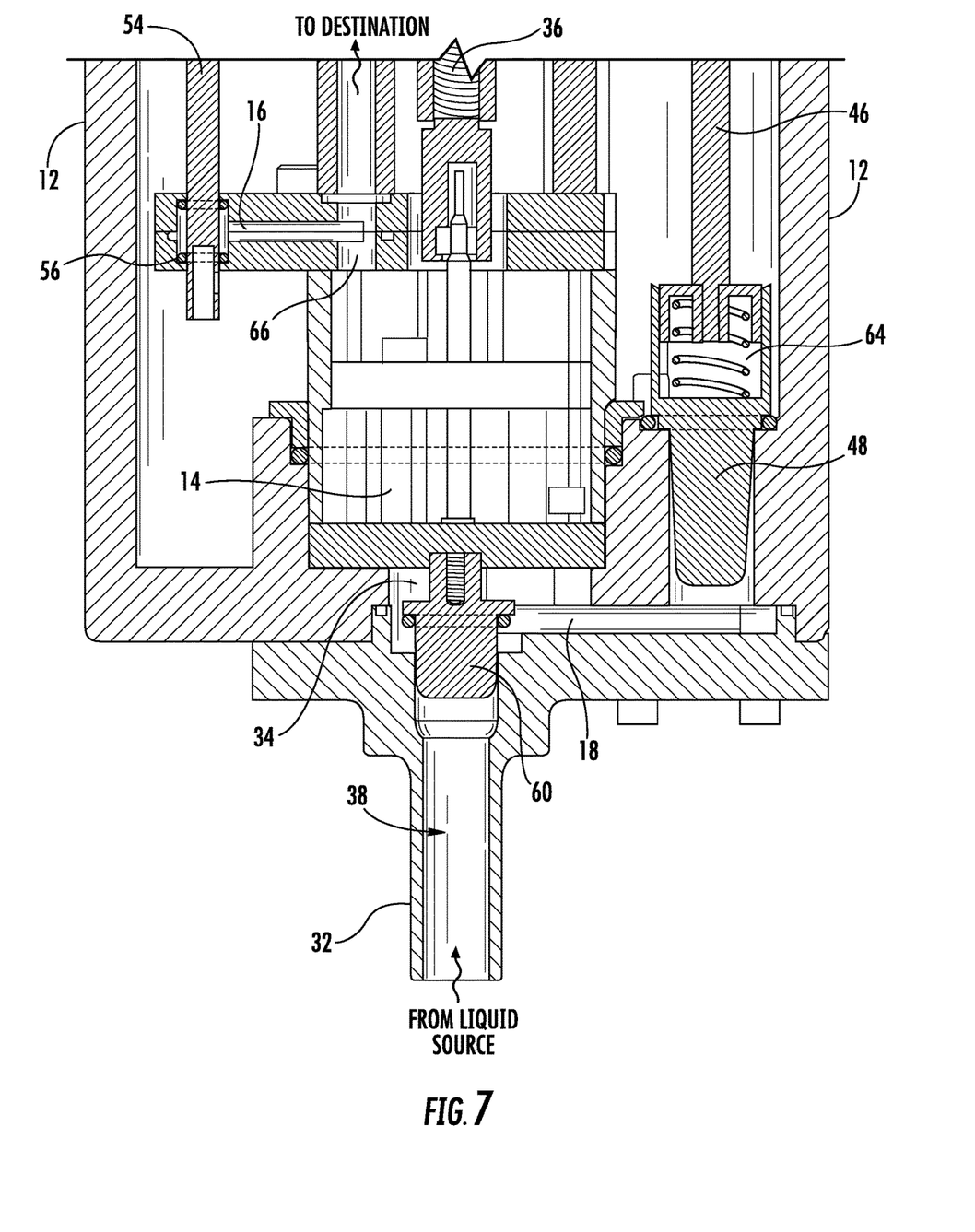
FIG. 7 is a representative sectional detail view of the reservoir tank of FIG. 1.
Figure 11:
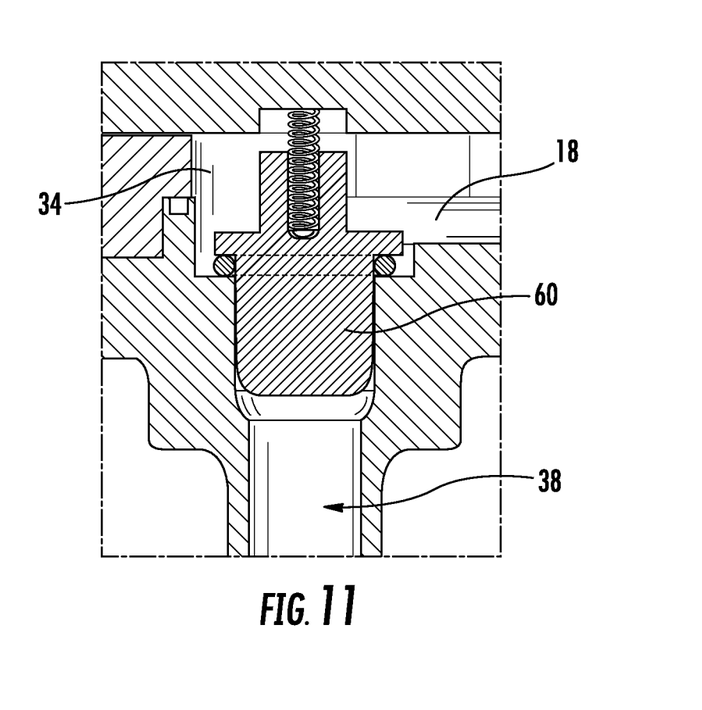
FIG. 11 is a representative sectional detail view of the inlet check valve of FIG. 7, but in the closed position.

Supply path 38 places the pump inlet 34 in fluid communication with the liquid source 20 so that the liquid 24 from the container 22 may flow to the pump inlet 34. Supply path 38 may comprise siphon tube 26 extending into container 22 through coupling 28 and drip cup 30, as will be described in more detail herein. Supply path 38 may comprise hose 32 (e.g., a flexible hose) connected to the outlet end 62 of siphon tube 26 and also attached to the bottom of reservoir tank 12. (FIG. 1, 7.) In this manner, the container 22 may be located remotely from the reservoir tank 12. The supply path 38 may include an inlet check valve 60, which may be located proximate the reservoir tank 12 as shown in FIG. 7. The inlet check valve 60 is adapted to restrict the liquid 24 from flowing toward the liquid source 20, that is, in a "reversed" direction within the supply path 38. The inlet check valve 60 is operative between an open position (FIG. 7) and a closed position (FIG. 11).

Pump motor 35 provides power via pump shaft 36 to the pump 14 within reservoir tank 12. (FIGS. 1, 7.) Pump 14 may be a gear pump, for example, any of the gear pumps (such as rotary pumps or gerotor pumps) as described in U.S. Pat. No. 6,617,367, which is incorporated herein in its entirety by reference. Pump 14 has a pump inlet 34 to receive the liquid 24 from source 20 outside of reservoir tank 12 and a pump outlet 66 so that liquid 24 from the supply path 38 may be pumped or delivered to a destination outside of or remote from the reservoir tank 12.

The reservoir tank 12 is configured to have a normal or operating range for containing the level of liquid 24 in the reservoir tank 12. The normal or operating range for the liquid level is between a given low level and a given high level. The low level of the liquid is set to be high enough within the reservoir tank such that in normal operation the pump 14 is positioned to be submerged in the liquid within the reservoir tank beneath the low level. The level of liquid within the reservoir tank may be measured by a liquid level gauge, sensor or transmitter 74 (FIG. 14), for example, a solid-state sensor with a resistive output that varies with the level of liquid, for example available under the e-Tape trade name (Milone Technologies, Inc.). The volume of the reservoir tank may be selected to be sufficient to accommodate the volume of liquid that may flow back from the destination outside of the reservoir tank if there is an upset condition or other need for the liquid to back flow into the reservoir tank.

Figure 12:
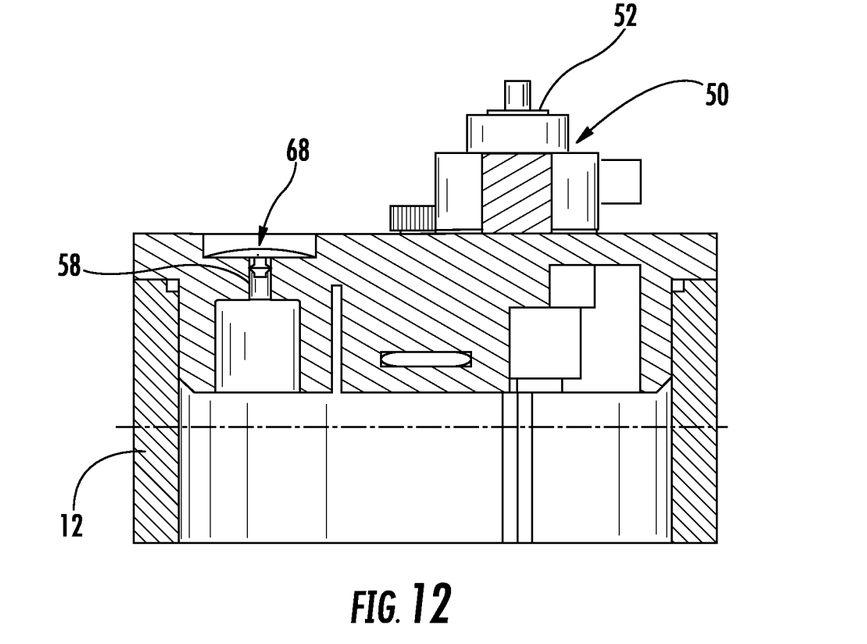
FIG. 12 is a representative sectional detail view of the vent port of FIG. 1.

The system may be adapted so that in normal operation the pressure within the reservoir tank 12 is at or near ambient atmospheric pressure. By "at or near" ambient atmospheric pressure is meant that the pressure within the reservoir tank 12 is within 1 psi of the ambient atmospheric pressure outside the reservoir tank 12. The reservoir tank 12 may comprise a vent port 58, for example located in the roof of the reservoir tank, to release pressure and/or vapor within the reservoir tank 12 through the vent port 58 to outside of the reservoir tank as the internal pressure rises above the external ambient atmospheric pressure. (FIG. 1, 12.) The vent port 58 may comprise a vent check valve 68, such as an umbrella check valve as illustrated in FIG. 12, to impede the flow of ambient external air into the reservoir tank 12 through the vent port 58.

Figure 13:
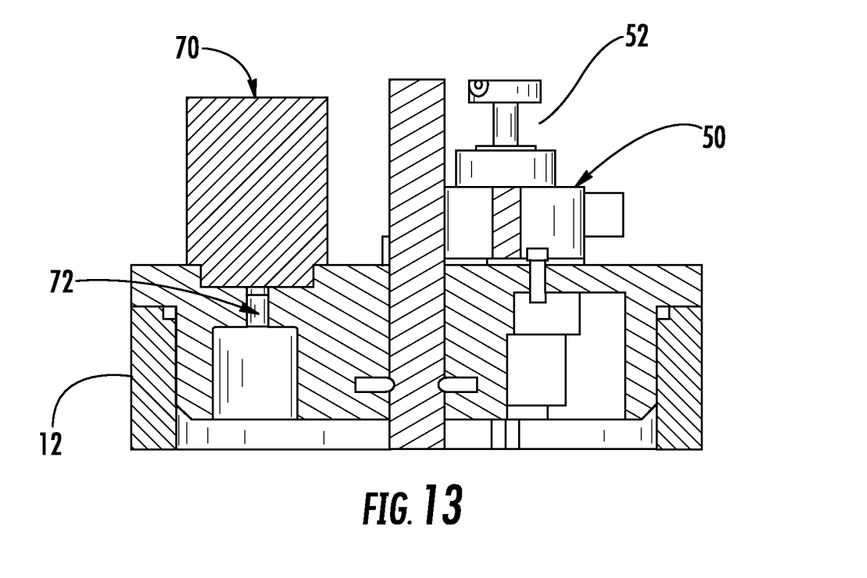
FIG. 13 is a representative sectional detail view of an embodiment including a desiccant dryer on the reservoir tank.

As the liquid level falls within the reservoir tank, external air may be drawn into the reservoir tank 12 through one or more unsealed ports within the reservoir tank, such as, for example where one or more of the recirculation valve shaft 46, bleed valve actuator shaft 54, or pump shaft 36 system enter through the wall of the reservoir tank. In an embodiment, the reservoir tank may comprise intake port 72 through which air may flow as the pressure within the reservoir tank 12 drops below the external ambient pressure. (FIG. 13.) The system may include a desiccant dryer 70 to extract water vapor from the external ambient air that may flow through the dryer before entering the reservoir tank through intake port 72, so that the water content of the air may be reduced. (FIG. 13.) A check valve (not shown) may be incorporated so that the flow is one-way into the reservoir tank via this intake pathway.

Figure 8:
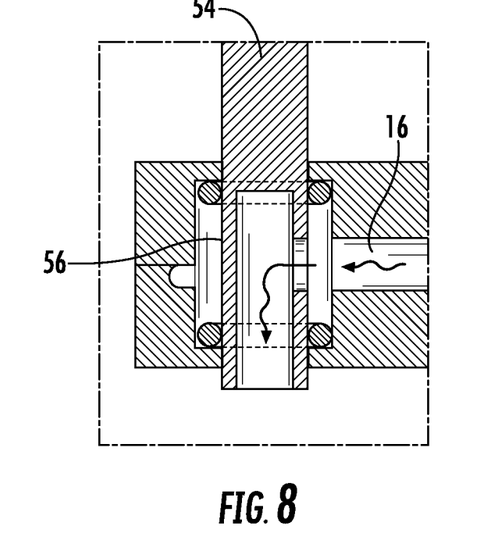
FIG. 8 is a representative sectional detail view of the bleed valve of FIG. 7, but in the open position.

Bleed path 16 places the pump outlet 66 in fluid communication with the reservoir tank 12. Bleed path 16 includes bleed valve 56 operative to control the flow of liquid 24 through the bleed path 16 to maintain the liquid level in the reservoir tank above the low level. Bleed valve 56 may be moved from a closed position (FIG. 7) to an open position (FIG. 8) by bleed valve actuator 50, which includes bleed valve motor 52, such as a stepper motor, and bleed valve actuator shaft 54 attached to the bleed valve 56. In the bleed valve closed position, the flow of liquid 24 in the bleed path 16 is blocked. In the bleed valve open position, the bleed path 16 is open so that fluid 24 from the pump outlet 66 may flow from the relative high pressure of the pump outlet to the relatively low pressure of the reservoir tank 12. The bleed valve 56 may be operative to open if the liquid level in the reservoir tank is below the low level. The low level of the liquid is set to be high enough within the reservoir tank such that in normal operation the bleed valve 56 is positioned to be submerged in the liquid 24 within the reservoir tank 12 beneath the low level.

Figure 9:
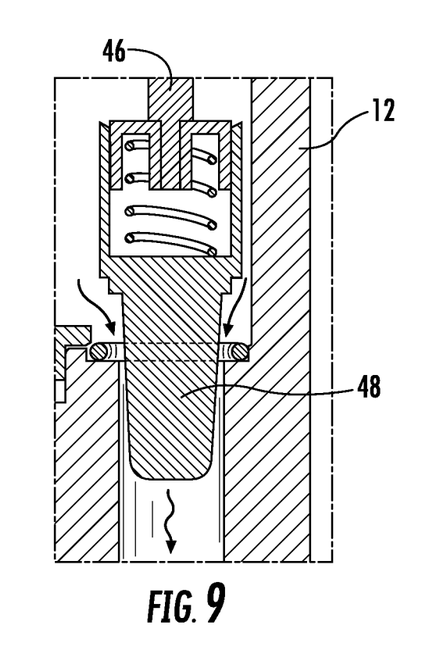
FIG. 9 is a representative sectional detail view of the recirculation valve of FIG. 7, but in the open position.

Recirculation path 18 places the pump inlet 34 in fluid communication with the reservoir tank 12. Recirculation path 18 includes recirculation valve 48 operative to control the flow of liquid 24 through the recirculation path 18 to maintain the liquid level in the reservoir tank below the high level. Recirculation valve 48 may be moved from a closed position (FIG. 7) to an open position (FIG. 9) by recirculation valve actuator 42, which includes recirculation valve motor 44, such as a stepper motor, and recirculation actuator shaft 46 attached to the recirculation valve 48. In the recirculation valve closed position, the flow of liquid 24 in recirculation path 18 is blocked. In the recirculation valve open position, the recirculation path 18 is open so that the fluid 24 from the reservoir tank may flow from the relatively higher pressure of the reservoir tank 12 to the relatively lower pressure (i.e., suction pressure) of the pump inlet 34. The recirculation valve 48 may be operative to open if the liquid level is above the high level for the reservoir tank 12. The low level of the liquid is set to be high enough within the reservoir tank 12 such that in normal operation the recirculation valve 48 is positioned to be submerged in the liquid 24 within the reservoir tank 12 beneath the low level.

The positioning of one or more of the pump 14, the bleed valve 56, and recirculation valve 48 (and other operators having moving parts), as submerged in liquid 24 reduces the chance that the functionality of these operators may be impaired with hard crystalline structure or residue resulting from the reaction of the liquid 24, for example comprising isocyanate, with ambient moisture.

Figure 10:
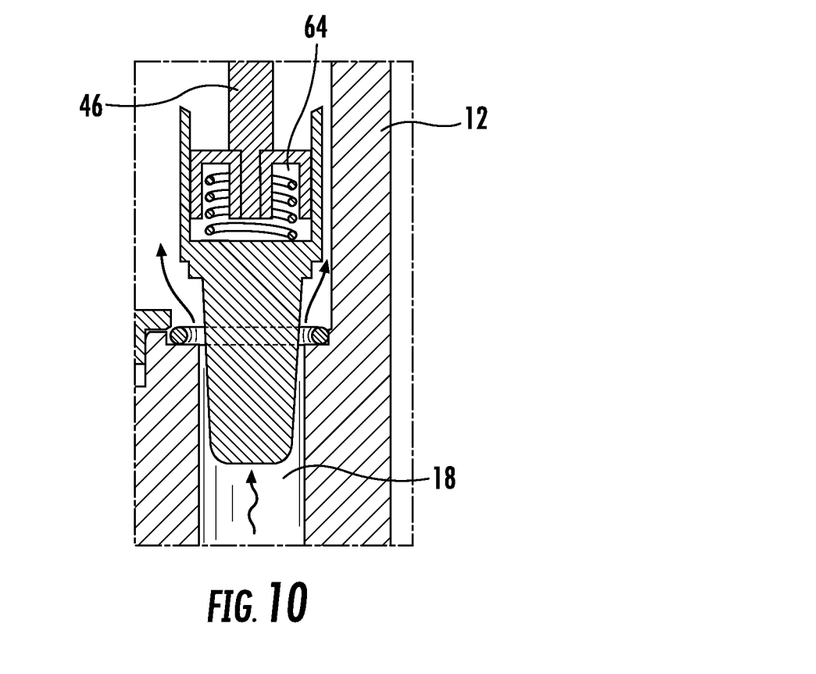
FIG. 10 is a representative sectional detail view of the recirculation valve of FIG. 7, but having its relief valve functionality in the open position.

Inlet relief valve 64 (FIGS. 7, 14) is positioned and adapted to place the pump inlet in fluid communication with the reservoir tank 12 if the pressure at the pump inlet exceeds the set pressure (e.g., 1,300 psig) for the inlet relief valve. The inlet relief valve 64 and the recirculation valve 48 may be combined as a dual-functionality valve (e.g., a poppet valve) as illustrated in FIG. 7. The inlet relief valve 64 may move from a normally closed position (FIG. 7) to an open position (FIG. 10) when the pressure within the pump inlet 34 (and recirculation path 18 in fluid communication with the pump inlet) exceeds the set pressure, causing fluid to flow in a reverse direction through the recirculation path 18 and into the reservoir tank. Such situation may occur, for example, if the pressure downstream from pump 14 at the pump outlet 66 is abnormally transferred or leaked through the pump in a reverse direction (for example when the pump is "off" in a stationary position) to increase the pressure on the pump inlet 34.

Operation

Figure 14:
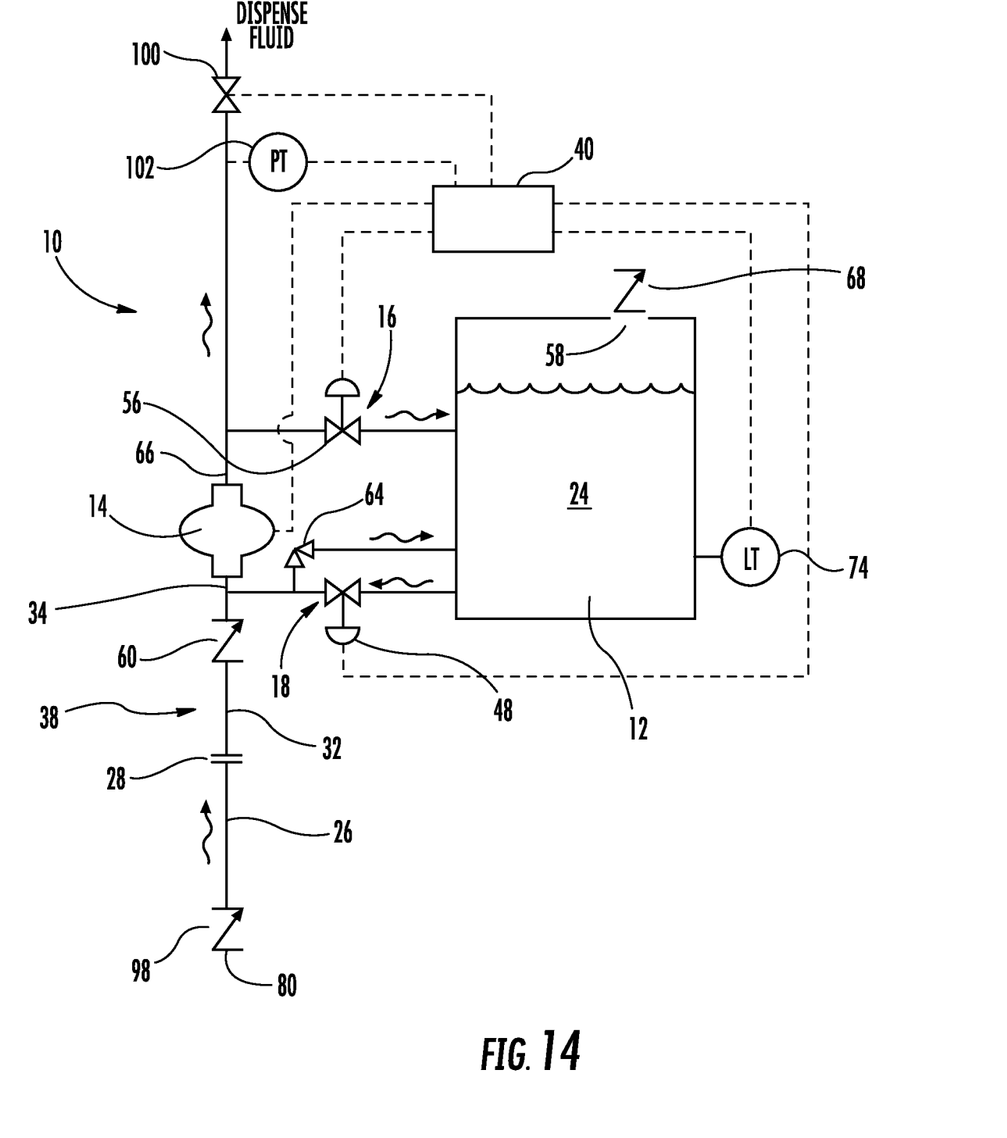
FIG. 14 is a representative process control diagram of the system.
Figure 15:
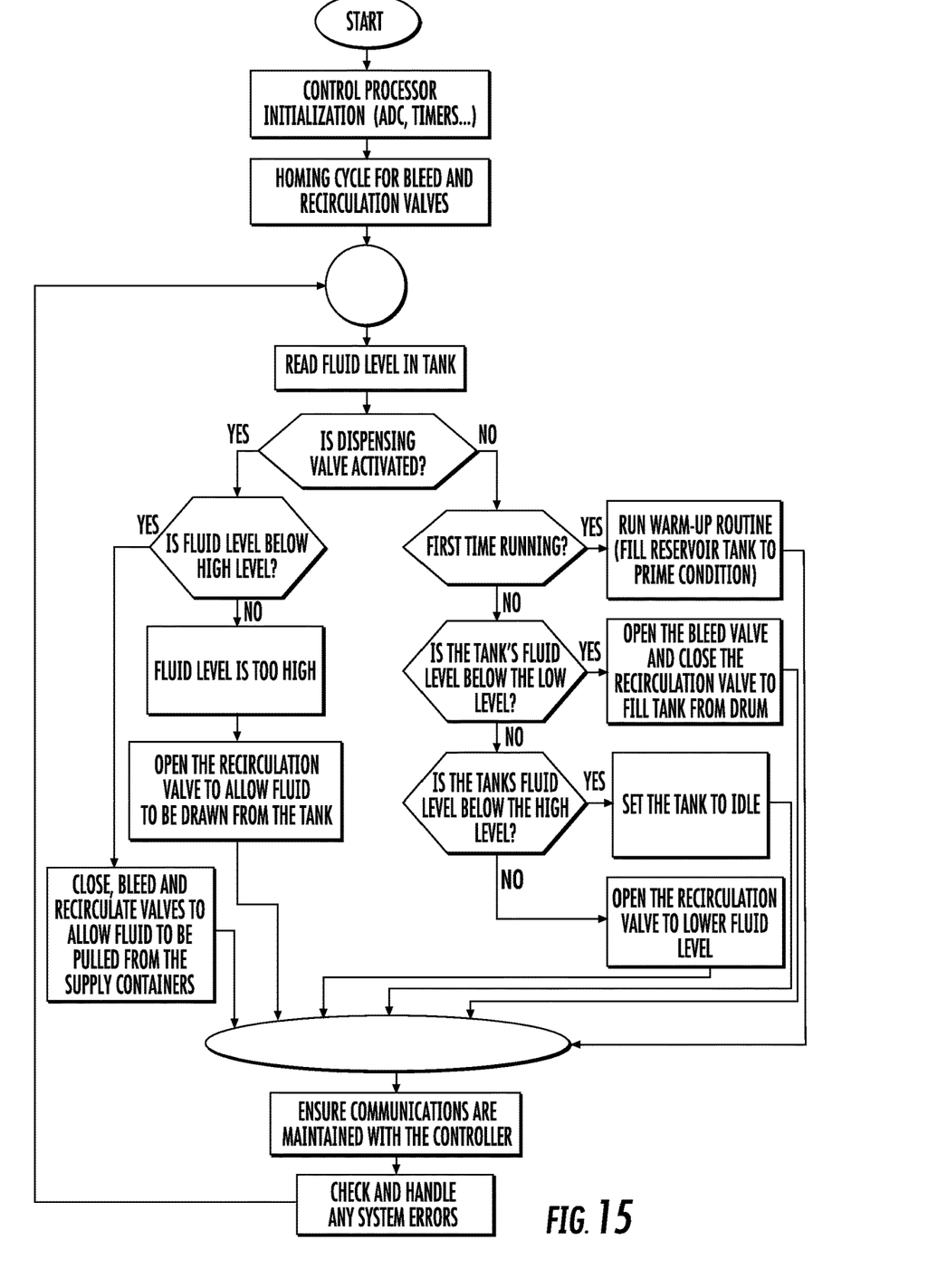
FIG. 15 is a representative logic flowchart for the controller.

Controller 40 includes a processor that may be programmed to interface with one or more of the level gauge or liquid level sensor 74, pressure transmitter 102, and dispensing valve 100 to receive information and control the operation of the valves (e.g., via the actuators 42, 50). (FIGS. 14-15.)

The system 10 may be placed in a priming mode in which the pump is on, the bleed valve 56 is open to flow liquid 24 from the pump outlet 66 through the bleed path 16 and into the reservoir tank 12. The recirculation valve 48 is closed to block flow in the recirculation path 18.

In operating mode, the pump 14 may turn on when the pressure at the pump outlet 66 falls below a low pressure set point and may turn off when the pressure at the pump outlet 66 increases above a high pressure set point. This pressure may be measured by pressure gauge 102 and the pressure level transmitted to the controller 40, where the processor of the controller 40 may be programmed to receive the pressure measurement from the pressure gauge 102, compare the pressure information to the high and low pressure set points, and then instructs the pump motor 35 to activate or inactivate to operate the pump in response to the pressure measurement.

The controller 40 may receive the information from the level gauge 74 for the measurement of the level of the liquid in the reservoir tank 12. The processor of the controller 40 may be programmed to receive the liquid level measurement from the level gauge and to open the recirculation valve 48 if the liquid level rises above the high level, so that the pump 18 draws liquid from the reservoir tank 12 through the recirculation path 18. The pump can then sent the fluid to a destination outside of the reservoir tank 12. The processor of the controller 40 may also be programmed to open the bleed valve 56 if the liquid level in the reservoir tank 12 falls below the low level. (FIG. 14.)

The system 10 may be used to supply liquid by first priming the pump 14 as necessary, by activating the pump, closing the recirculation valve 48, and opening the bleed valve 56 so that the pump applies a suction to the liquid source 20 and liquid from the pump outlet 66 flows through the bleed path 16 into the reservoir tank 12 until the liquid level in the reservoir tank is above the low level. Subsequently, the bleed valve 56 is closed so that the pump 14 can send liquid to a destination outside of the reservoir tank.

Assembly for Accessing Liquid

Figure 2:
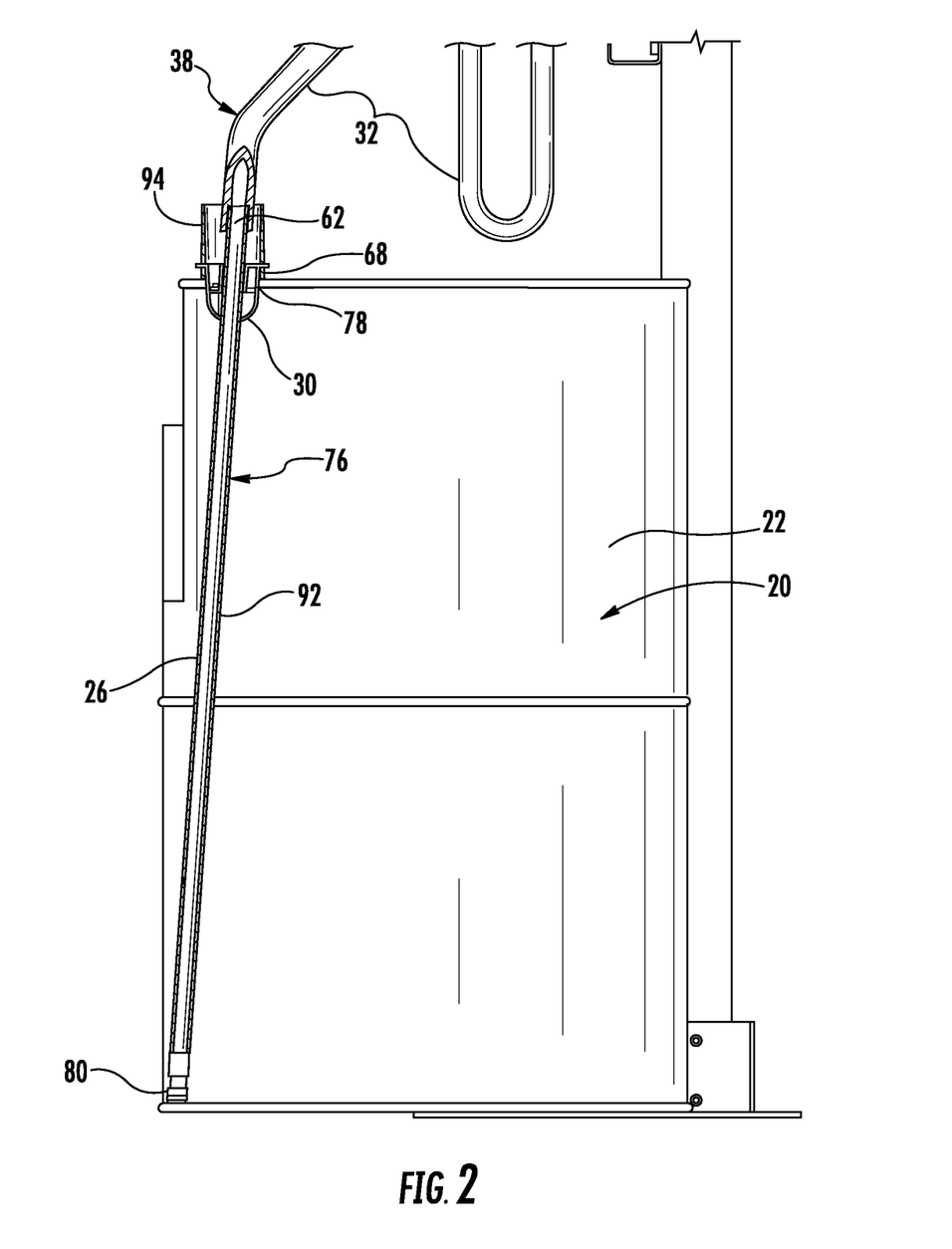
FIG. 2 is a representative sectional view taken along the line 2-2 of FIG. 1.

Additional embodiments of the disclosed subject matter relate to an assembly 76 for accessing liquid from a supply container 22 having a container opening 78. (FIG. 2.) The assembly includes a siphon tube 26 having an inlet end 80 and an opposing outlet end 62. The siphon tube 26 may be longer than the height of the container 22.

Figure 5:
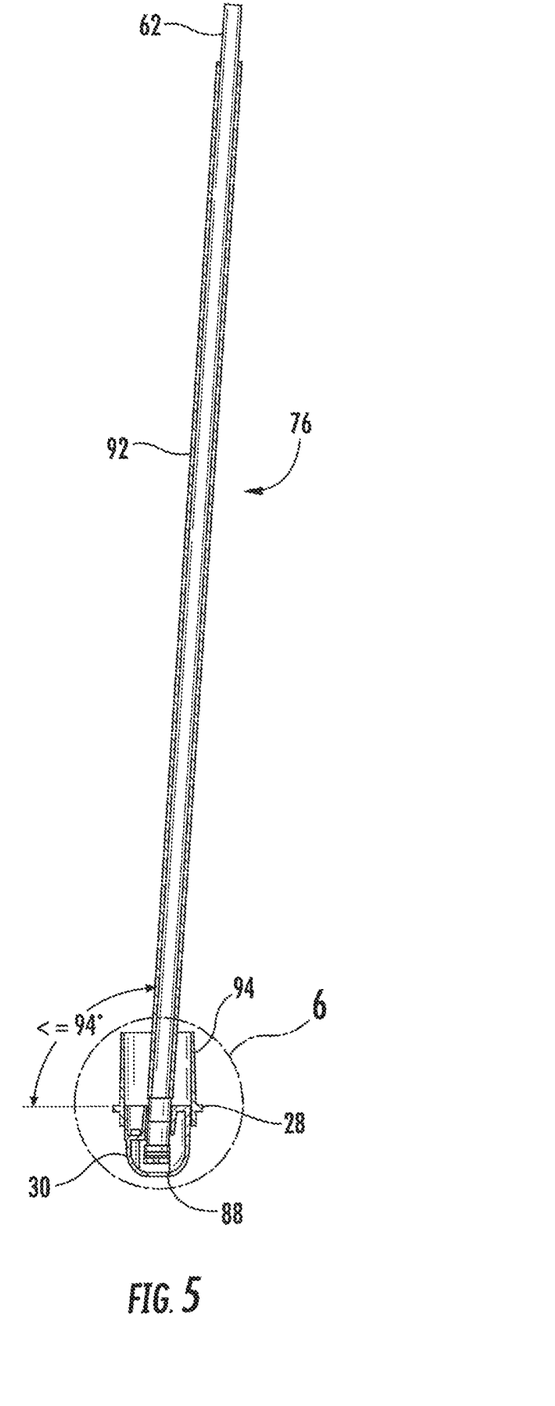
FIG. 5 is a representative sectional view taken along the line 5-5 of FIG. 4.

A coupling 28 is adapted to removably engage the container opening 78 to define a container side 82 of the coupling facing the interior of the container 22 as the coupling 28 is engaged with the container opening. For example, the coupling may be adapted to snap on and off of the container to surround the container opening 78. The coupling 28 defines a port 84 for slidably receiving the siphon tube 26 through the port 84. The siphon tube 26 may extend at a non-perpendicular angle relative the coupling 28. (FIG. 5.) For example, the siphon tube 26 may extend at an angle relative the coupling, for example, within the range of from 92 degrees to 100 degrees (e.g., see orientation in FIG. 5). The angled orientation of the siphon tube may be used to direct the inlet end 80 of the siphon tube at the "corner" or intersection of the vertical wall and bottom of the container so that the container may be completely emptied when tipped at a slight angle. (FIG. 2.)

Figure 3:
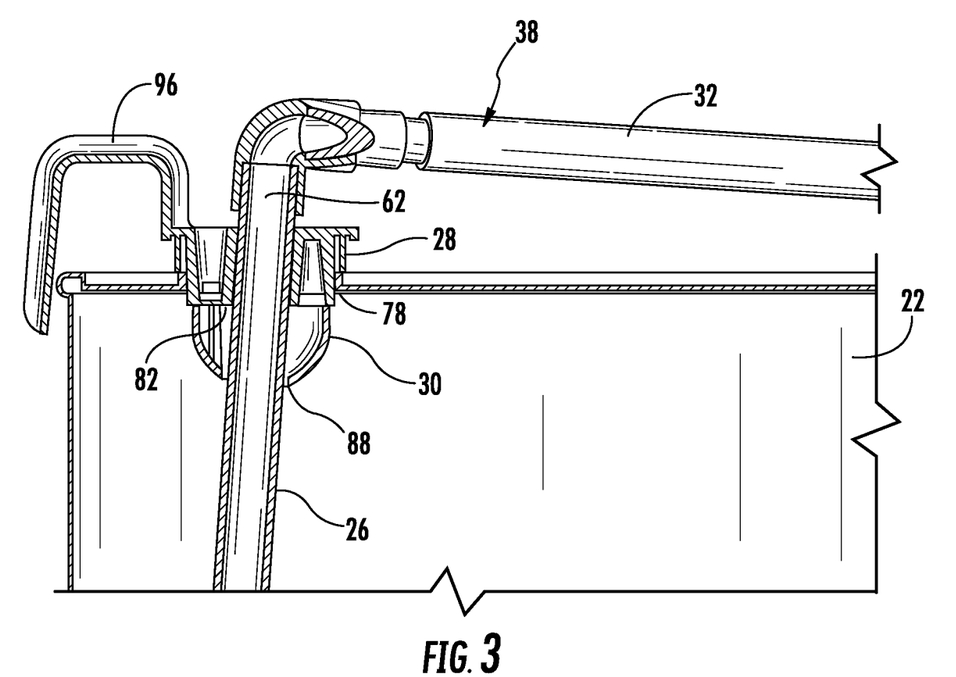
FIG. 3 is a representative cross-sectional view of an alternative embodiment of the drip cup.

The assembly 76 may include a handle 94 extending from the coupling 28 to facilitate the manual removal of the assembly from engagement with the supply container. (FIGS. 2, 4-6.) An alternative handle 96 is illustrated in FIG. 3. In this configuration, the handle 96 on the coupling 28 extends below or overhangs the top surface of the container 22, so that when the coupling is engaged with the container opening 78, the coupling 28 is properly oriented so that the angle of the tube 26 is directed to the corner of the container, as discussed above.

A drip cup 30 is attached to the container side 82 of the coupling 28. The drip cup 30 may be sized to be passable through the container opening 78. The drip cup 30 defines an interior 86 and a hole 88 generally concentric with the port 84 of the coupling 26. In this usage, generally concentric is not meant to have mathematical, geometrical precision, but rather concentric in the sense that the siphon tube may extend through both the drip cup hole and the coupling port 84. The size of the hole 88 of the drip cup 30 corresponds to the diameter of the inlet end 80 of the siphon tube 26. In this usage, corresponding means that the hole 88 is big enough to pass the inlet end 80 through the hole, while not being so big that the drip-catching functionality of the drip cup 30 is unreasonably diminished.

Figure 4:
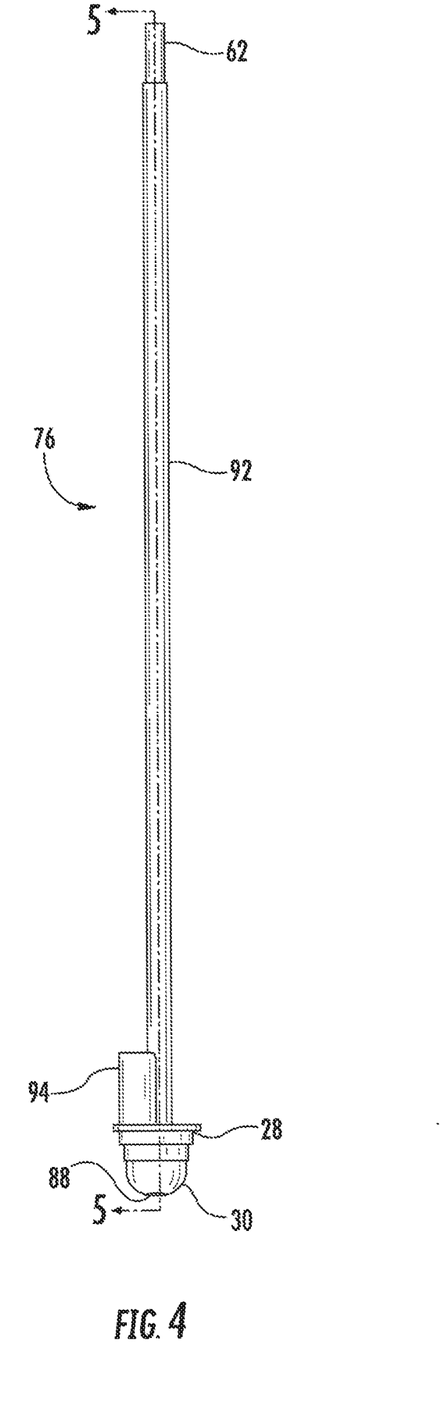
FIG. 4 is a representative side elevation view of the drip cup of FIG. 2 having the siphon tube in the withdrawn position.
Figure 6:
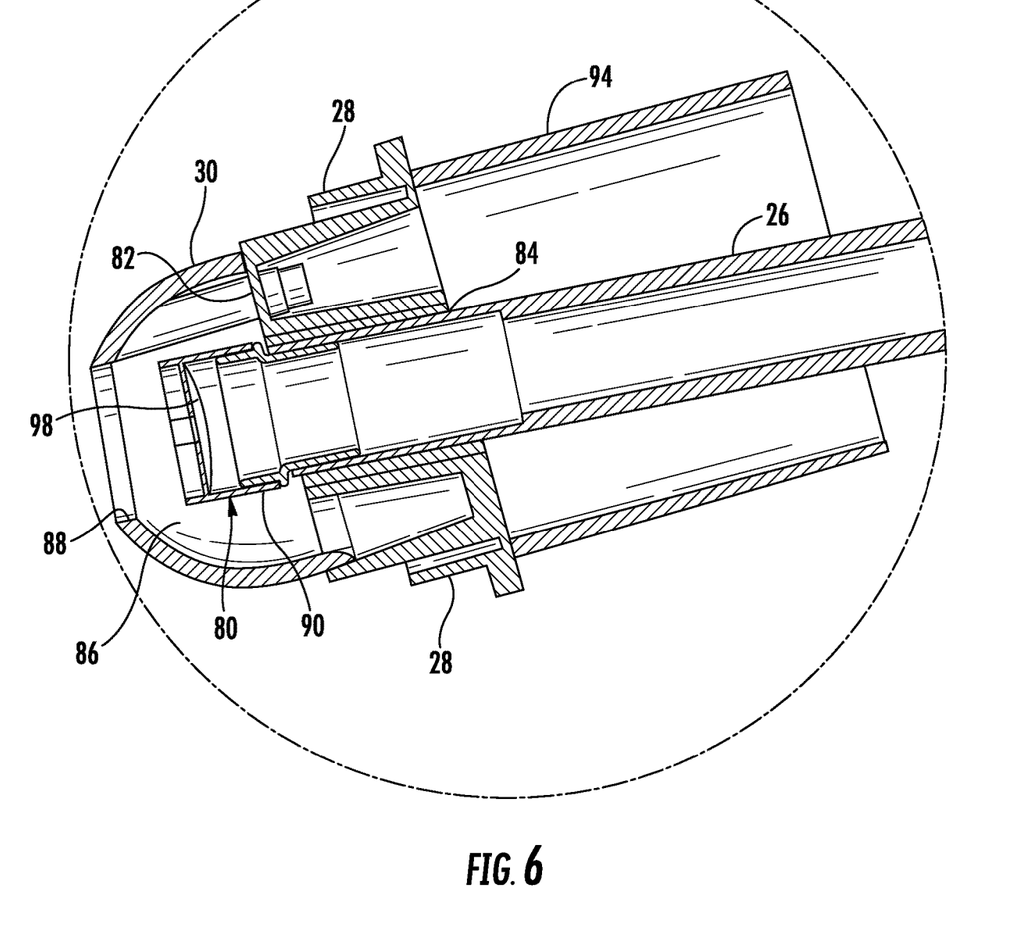
FIG. 6 is a representative detailed view of a portion of FIG. 5.

The assembly 76 is adjustable between (i) an extended position in which the siphon tube 26 extends through the port 84 of the coupling and through the hole 88 of the drip cup 30 to place the outlet end 62 of the siphon tube proximate the coupling 28 (FIG. 2) and (ii) a withdrawn position in which the inlet end 80 of the siphon tube 26 is proximate the coupling 26 and is within the interior 86 of the drip cup 30 (FIGS. 4-6).

The inlet end 80 of the siphon tube 26 may include a stop portion 90 having an outer diameter greater than the inner diameter of the port 84 of the coupling 26. (FIG. 6.) In this arrangement, the inlet end 80 of the siphon tube 26 is stopped from sliding through the port 84. The siphon tube 26 may include a check valve 98 (e.g., an umbrella check valve) at the inlet end 80 of the siphon tube to restrict liquid from leaving the siphon tube out of the inlet. (FIG. 3.)

The siphon tube 26 defines a middle portion 92 between the inlet end 80 and the outlet end 62. The inner diameter of the coupling port 84 may correspond to the outer diameter of the middle portion 92 of the siphon tube, so that liquid 24 on the outer surface of the tube 26 may be wiped from the siphon tube surface as the tube is moved from the extended position (FIG. 2) to the withdrawn position (FIGS. 4-5).

The assembly 76 is useful during the exchange of an empty container for a full container to minimize the loss or exposure of the operator to the liquid contained in the container, while maintaining the fluid within the supply path 38 to facilitate priming the pump for the next use. To make the transfer, the operator grasps the outlet end of the siphon tube without detaching the hose 32 from the outlet end of the siphon tube. The operator then slides the siphon tube upward through the coupling port 84, which may wipe the liquid off the exterior surface of the tube. The stop portion 90 prevents the operator from removing the siphon tube from the coupling. At this point, the inlet end of the tube is within the interior space 86 of the drip cup 30. The operator then grasps handle 96 or 98 to remove the coupling 28 (and the assembly 76) from engagement with the container 22. The inlet check valve 98 maintains the column of liquid 24 within the assembly 76, siphon tube 26, and hose 32. The siphon tube may be tilted in a general horizontal orientation so that any drip of fluid at the inlet end 80 will be caught by the drip cup 30. (FIG. 6.)

The operator may then install assembly 76 in a full container essentially by reversing the order of steps described above, for example, to install the coupling to engage the container opening of the replacement container and slide the siphon tube through the coupling port to extend into the container.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A system for supplying a liquid, the system comprising:
   a reservoir tank having an operating range of liquid level between a low level and a high level of the liquid;
   a pump positioned to be submerged in the liquid within the reservoir tank beneath the low level, the pump having an inlet to receive the liquid from a source outside of the reservoir tank and an outlet to deliver the liquid to a destination outside of the reservoir tank;
   a bleed path placing the pump outlet in fluid communication with the reservoir tank, the bleed path having a bleed valve controlling the flow of liquid through the bleed path to maintain the liquid level in the reservoir tank above the low level; and
   a recirculation path placing the pump inlet in fluid communication with the reservoir tank, the recirculation path having a recirculation valve controlling the flow of liquid through the recirculation path to maintain the liquid level in the reservoir tank below the high level.

2. The system of claim 1 wherein the system is adapted to operate with the pressure within the reservoir tank at or near ambient atmospheric pressure.

3. The system of claim 1 wherein the reservoir tank comprises a vent port to release pressure within the reservoir tank as the pressure rises above ambient atmospheric pressure.

4. The system of claim 3 wherein the vent port comprises a vent check valve to reduce the flow of ambient air into the reservoir tank through the vent port.

5. The system of claim 1 further comprising at least one of a desiccant dryer to extract water vapor from the ambient air that may flow into the reservoir tank or a dispenser as the destination outside of the reservoir tank to receive the liquid from the pump outlet.

6. The system of claim 1 wherein at least one of the bleed valve or the recirculation valve is positioned to be submerged in the liquid within the reservoir tank beneath the low level.

7. The system of claim 1 further comprising an inlet relief valve adapted to place the pump inlet in fluid communication with the reservoir tank if the pump inlet pressure exceeds the set pressure for the inlet relief valve.

8. The system of claim 7 wherein the inlet relief valve and the recirculation valve are combined as a dual-functionality valve.

9. The system of claim 1 wherein:
   the bleed valve is operative to open if the liquid level in the reservoir tank is below the low level; and
   the recirculation valve is operative to open if the liquid level is above the high level.

10. The system of claim 1 wherein the system has a priming mode wherein:
    the pump is on;
    the bleed valve is open to flow liquid from the pump outlet through the bleed path and into the reservoir tank; and
    the recirculation valve is closed to block flow in the recirculation path.

11. The system of claim 1 further comprising a supply path placing the pump inlet in fluid communication with the liquid source.

12. The system of claim 1 further comprising:
    a level gauge to measure the level of the liquid in the reservoir tank; and
    a controller comprising a processor programmed to:
        receive the liquid level measurement from the level gauge; and
        to open the recirculation valve when the liquid level rises above the high level.

* * * * *